United States Patent
Zeng et al.

(10) Patent No.: US 10,605,155 B2
(45) Date of Patent: Mar. 31, 2020

(54) SYSTEM AND METHOD FOR OPERATING AN ELECTRIC ASSISTED VARIABLE GEOMETRY TURBOCHARGER

(71) Applicant: Ford Global Technologies, LLC, Dearborn, MI (US)

(72) Inventors: Tao Zeng, Bloomfield Hills, MI (US); Liangjun Hu, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 103 days.

(21) Appl. No.: 15/916,908

(22) Filed: Mar. 9, 2018

(65) Prior Publication Data

US 2019/0277188 A1    Sep. 12, 2019

(51) Int. Cl.
| | |
|---|---|
| *F02B 37/14* | (2006.01) |
| *F02M 26/05* | (2016.01) |
| *F02M 26/06* | (2016.01) |
| *F02B 39/10* | (2006.01) |
| *F02D 41/00* | (2006.01) |

(52) U.S. Cl.
CPC .............. *F02B 37/14* (2013.01); *F02B 39/10* (2013.01); *F02D 41/0007* (2013.01); *F02D 41/0052* (2013.01); *F02D 41/0072* (2013.01); *F02M 26/05* (2016.02); *F02M 26/06* (2016.02); *F02D 2041/0075* (2013.01); *F05D 2250/90* (2013.01)

(58) Field of Classification Search
CPC ........ F02M 26/05; F02M 26/06; F02B 39/10; F02D 41/0052; F02D 41/0072; F02D 41/0007; F02D 2041/0075; F05D 2250/90
See application file for complete search history.

(56) References Cited

U.S. PATENT DOCUMENTS

| | | | |
|---|---|---|---|
| 6,460,522 B1 | 10/2002 | Rimnac | |
| 7,296,409 B2 | 11/2007 | Spooner | |
| 7,779,634 B2 | 8/2010 | Barthelet et al. | |
| 9,051,903 B2 | 6/2015 | Wolk | |
| 2006/0236692 A1* | 10/2006 | Kolavennu | F01N 3/0807 60/602 |
| 2013/0047939 A1* | 2/2013 | Boot | F01D 17/165 123/2 |

OTHER PUBLICATIONS

Nguyen-Schäfer, H. "Thermodynamics of Turbochargers," Retrodynamics of Automotive Turbochargers, Ch. 2, Available as Early as Jan. 2015, 17 pages.

* cited by examiner

*Primary Examiner* — Brandon D Lee
(74) *Attorney, Agent, or Firm* — Geoffrey Brumbaugh; McCoy Russell LLP

(57) ABSTRACT

Methods and systems are provided for operating an electric assisted turbocharger. In one example, a method may include adjusting a position of a turbine of the turbocharger responsive to a level of a power deficiency, and operating an electric motor of the turbocharger based on the power deficiency.

18 Claims, 9 Drawing Sheets

SYSTEM AND METHOD FOR OPERATING AN ELECTRIC ASSISTED VARIABLE GEOMETRY TURBOCHARGER

FIELD

The present description relates generally to methods and systems for controlling an electric assisted variable geometry turbocharger coupled to an internal combustion engine.

BACKGROUND/SUMMARY

Engines may use a turbocharger to provide boosted intake air for improved engine torque/power output density. The turbocharger may include a compressor coupled to an exhaust-driven variable geometry turbine (VGT). The air flow through the compressor may be adjusted by changing geometry or position of the turbine vanes to improve the compressor operating range and the turbocharger efficiency. However, operating the turbocharger alone may not meet the high torque/power output demand.

One attempt to address the above issue includes an electric assisted turbocharger. One example approach is shown by Barthelet et al. in U.S. Pat. No. 7,779,634. Therein, an electrical motor is coupled to the turbocharger between the compressor and the turbine. The motor may provide additional boost to the engine to increase the operating range of the turbocharger. The motor may also operate as a generator to save energy.

However, the inventors herein have recognized potential issues with such systems. As one example, coupling the electric motor to the turbocharger may further complex the exhaust gas recirculation (EGR) rate and boost pressure control strategies. For example, both the EGR rate and the boost pressure may be affected by adjusting any one of the actuators including the VGT, the electric motor, and the EGR valve. An effective control strategy is required for operating the actuators to track the target EGR rate and the target boost pressure with low electric assistance, short response time, and low emission.

In one example, the issues described above may be addressed by a method comprising: a method comprising: responsive to a power deficiency below a threshold, adjusting a position of a turbine coupled to a compressor for a desired turbine efficiency, the compressor providing boosted air to an engine and the power deficiency being a difference between a target and an actual boost pressure; and responsive to the power deficiency above the threshold, adjusting the turbine position based on a target flow of exhaust gases recirculated back into the engine. In this way, the electric assisted VGT may be controlled to meet the target EGR rate and target boost pressure with low fuel consumption and reduced emission.

As one example, a power deficiency may be calculated based on the target boost pressure and the measured boost pressure. The engine operation may transition among three operation modes responsive to the power deficiency. For example, the engine operation may transition to a first mode responsive to the power deficiency being zero or negative. In the first mode, the VGT is adjusted to track the target boost pressure, and the EGR valve is adjusted to track the target EGR flow. The motor may not operate or may operate in the regenerative mode to conserve energy. The engine operation may transition to a second mode responsive to the power deficiency being positive and lower than the threshold. In the second mode, the VGT position may be adjusted to achieve the desired efficiency, which may be an optimal (maximum) turbine efficiency, the motor may be adjusted to track the target boost pressure based on the adjusted VGT position, and the EGR valve may be adjusted to track the target EGR flow. In this mode, the boost pressure is adjusted via the VGT and the motor, while the EGR flow is adjusted via the EGR valve. By adjusting the VGT to the desired turbine efficiency, energy consumption of the electric assisted turbocharger may be reduced. The engine operation may transition to a third mode responsive to the power deficiency being the same or higher than the threshold. In the third mode, both the VGT position and the EGR valve position may be simultaneously adjusted to track the target EGR flow. The motor may then operate to track the boost pressure based on the adjusted VGT position. As such, the boost pressure is adjusted by the motor, while the EGR flow is adjusted by the VGT and the EGR valve. By adjusting the VGT position to track the target EGR flow, high EGR flow demand during high power deficiency (such as during a transient tip-in) may be met. By grouping the actuators differently responsive to the level of power deficiency, the engine may quickly reach the target working point. Further, the fuel economy may be optimized by limiting the electric assistance and increasing the turbine efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
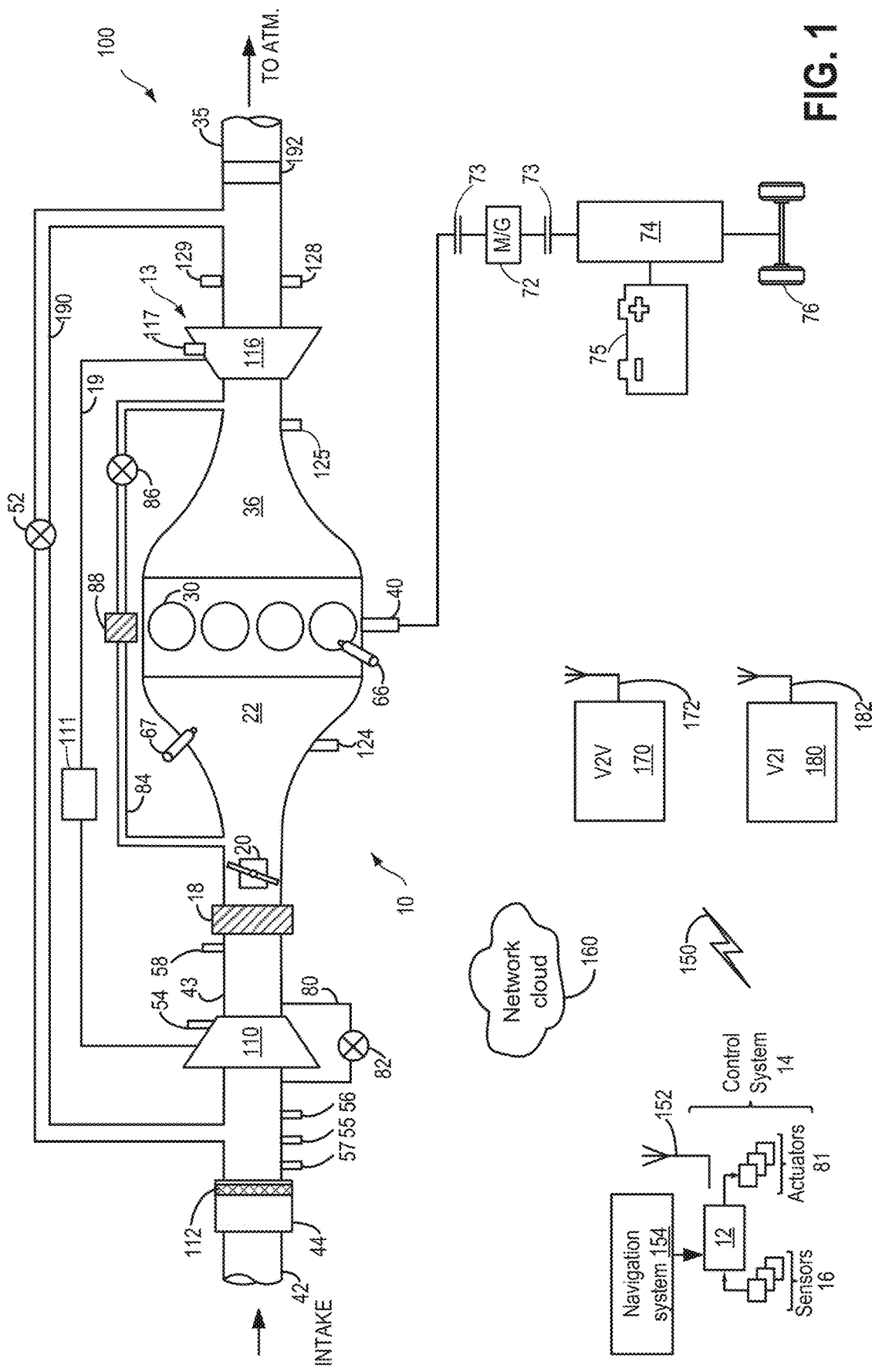
FIG. 1 shows an example embodiment of a vehicle system that includes an engine with electric assisted variable geometry turbocharger.
Figure 2:
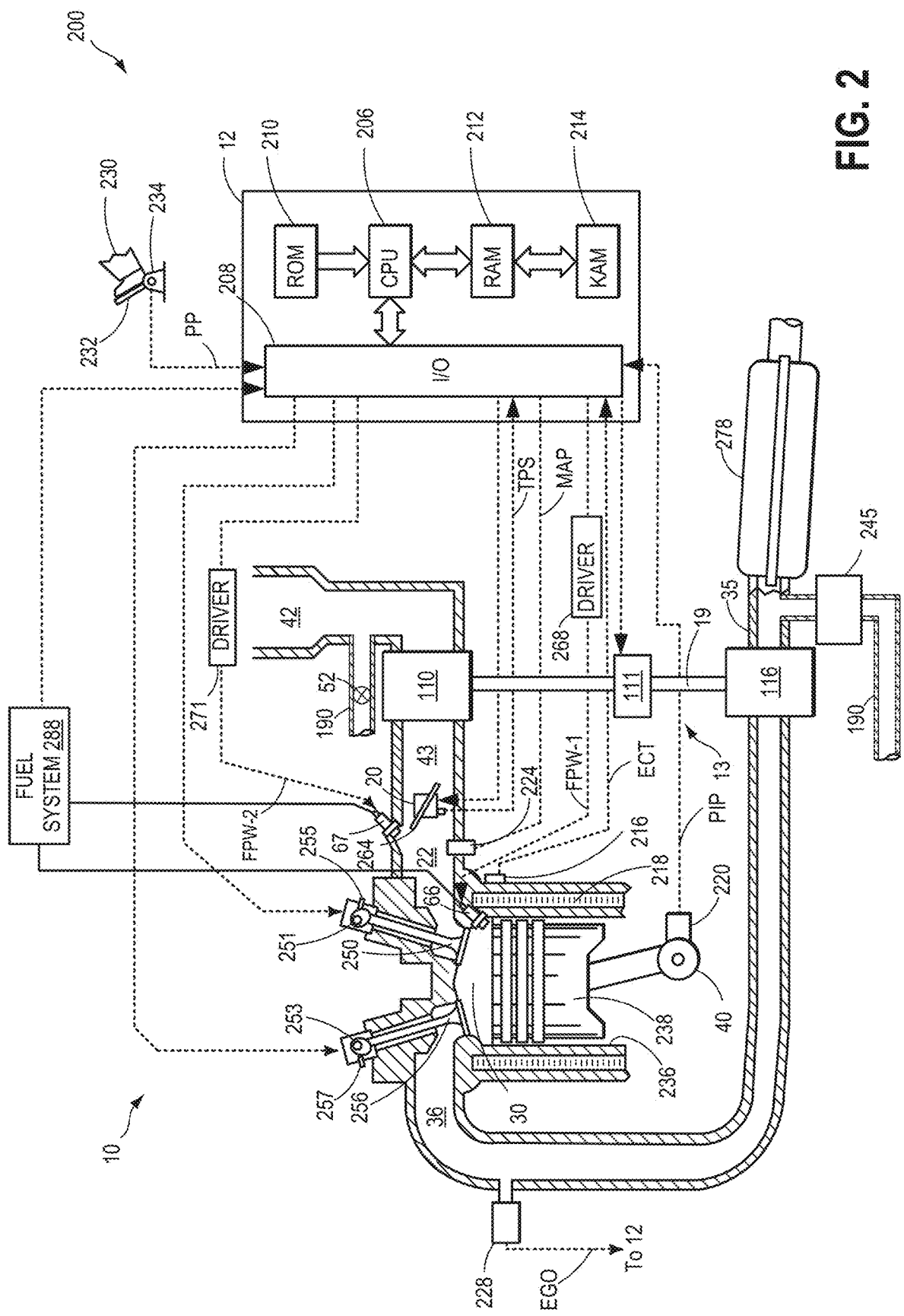
FIG. 2 shows a diagram of an example embodiment of one cylinder of the turbocharged engine of FIG. 1.
Figure 3:
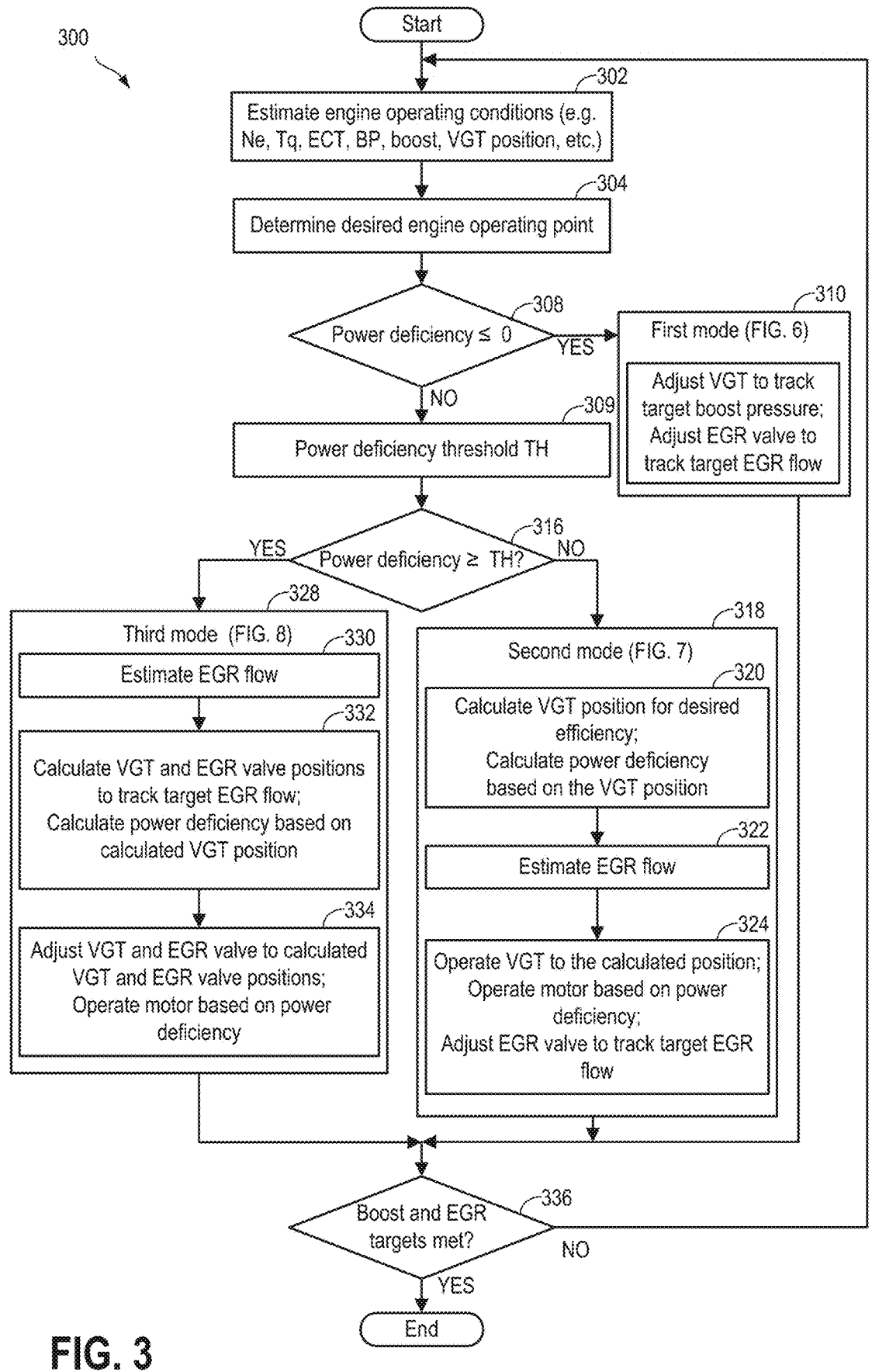
FIG. 3 shows an example method for operating the engine of FIG. 2.
Figure 8:
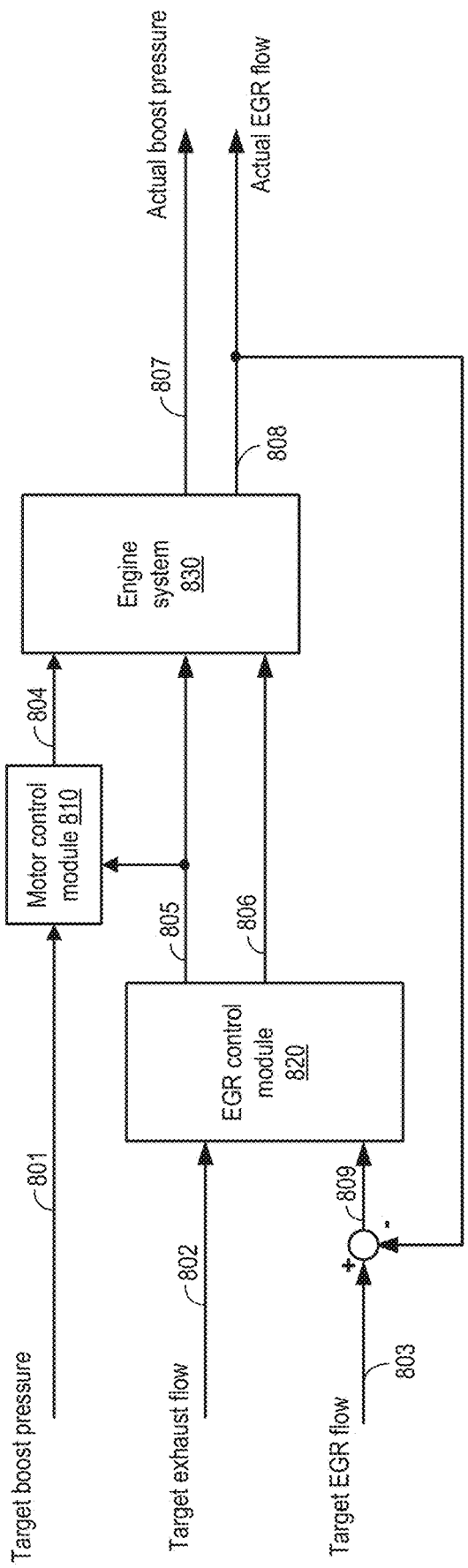
FIG. 8 is an example block diagram for a third engine operation mode.
Figure 9:
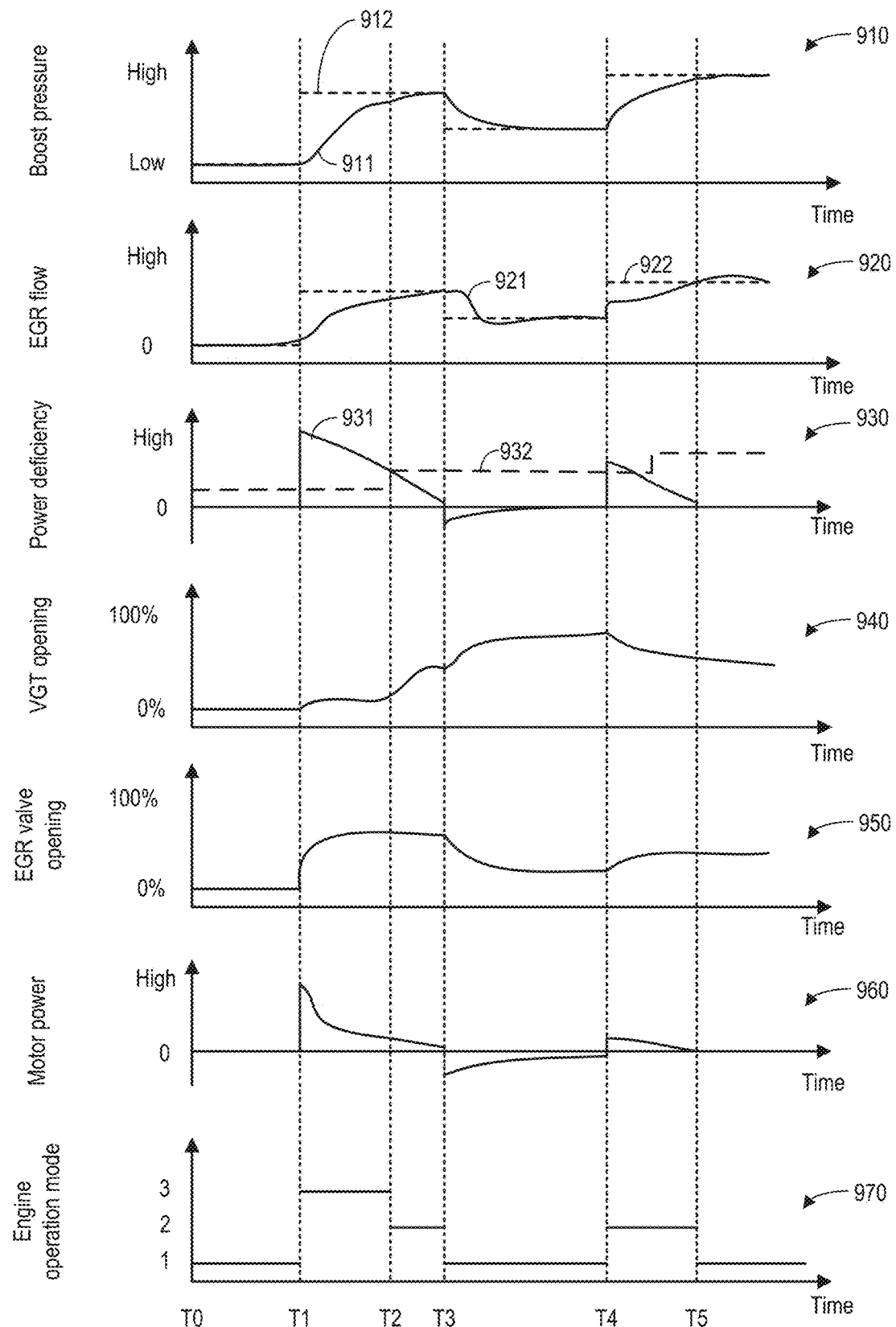
FIG. 9 illustrates the timeline of parameters while implementing the method of FIG. 3.

The following description relates to systems and methods for operating an engine with an electric assisted variable geometry turbocharger. The turbocharger may include a variable geometry turbine and an electric motor coupled between a compressor and the variable geometry turbine. Examples of the vehicle system and the engine are shown in FIG. 1 and FIG. 2. FIG. 3 shows an example method for operating the engine system. In particular, the engine may be operated under one of three difference modes base on the comparison of a power deficiency and a threshold. The threshold may be updated online based on engine operating conditions according to the map shown in FIG. 4. When the power deficiency is zero or negative, the engine may be operated in the first mode according to the block diagram of FIG. 6. When the power deficiency is between zero and the threshold, the engine may be operated in the second mode according to the block diagram of FIG. 7. In the second mode, the VGT is adjusted to a position based on FIG. 5 to maximize the turbine efficiency. When the power deficiency reaches the threshold, the engine may be operated in the third mode according to the block diagram of FIG. 8. Changes in the parameters over time are illustrated in FIG. 9.

Turning now to FIG. 1, an example embodiment of a vehicle system 100 is illustrated schematically. In one example, vehicle system 100 may be configured as an on-road motor vehicle. However, it will be appreciated that in other examples vehicle system 100 may be configured as an off-road vehicle. In some examples, vehicle system 100 may be a hybrid vehicle with multiple sources of torque available to one or more vehicle wheels 76. In other examples, vehicle system 100 is a conventional vehicle with only an engine, or an electric vehicle with only electric machine(s). In the example shown, vehicle system 100 includes engine 10 and an electric machine 72. Electric machine 72 may be a motor or a motor/generator. Crankshaft 40 of engine 10 and electric machine 72 are connected via a transmission 74 to vehicle wheels 76 when one or more clutches 73 are engaged. In the depicted example, a first clutch 73 is provided between crankshaft 40 and electric machine 72, and a second clutch 73 is provided between electric machine 72 and transmission 74. Controller 12, discussed herein, may send a signal to an actuator of each clutch 73 to engage or disengage the clutch, so as to connect or disconnect crankshaft 40 from electric machine 72 and the components connected thereto, and/or connect or disconnect electric machine 72 from transmission 74 and the components connected thereto. Transmission 74 may be a gearbox, a planetary gear system, or another type of transmission. The powertrain may be configured in various manners including as a parallel, a series, or a series-parallel hybrid vehicle.

Electric machine 72 receives electrical power from a traction battery 75 to provide torque to vehicle wheels 76. Electric machine 72 may also be operated as a generator to provide electrical power to charge battery 75, for example during a braking operation. In other examples, where vehicle system 100 is a conventional vehicle with only an engine, traction battery 75 may be a starting-lighting-ignition (e.g., SLI) battery that supplies electrical energy to the vehicle system 100.

In the depicted embodiment, engine 10 is a turbocharged engine including a turbocharger 13. Turbocharger 13 comprises a turbine 116 positioned in the exhaust passage 35 coupled to a compressor 110 positioned in an intake passage 42. Turbine 116 and compressor 110 may be coupled via a shaft 19. Compressor 110 may be positioned upstream of a charge air cooler 18 (also referred to herein as CAC) and an intake throttle 20. Turbine 116 may be driven (e.g., spun) by expanding exhaust gases from engine 10, and the rotational energy of turbine 116 may be transferred via shaft 19 to rotate compressor 110.

An electric motor 111 may be coupled to both compressor 110 and turbine 116. In one embodiment, the electric motor may be coupled to shaft 19 between the compressor 110 and turbine 116. The electric motor may be controlled by controller 12 to rotate the shaft 19 with current drawn from a battery (such as battery 75). The electric motor may also function as a generator and charge the battery under certain operating conditions.

In one example, turbine 116 may be a variable geometry turbine having variable vane positions wherein the angle of the vanes are adjustable to guide exhaust flow through the turbine blades in different patterns, thereby varying turbine speed and boost pressure provided by turbocharger 13. Air flow through turbine 116 may be adjusted by changing the position of the turbine via actuator 117.

Engine 10 receives air along intake passage 42 via an air box 44 including air cleaner 112. The air is compressed by the compressor 110 of turbocharger 13 and compressed air is delivered to induction passage 43. The compressed air passes through the induction passage 43, through the CAC 18 to cool, and through the throttle 20 before entering the intake manifold 22 where it enters the engine 10. In other words, compressor 110 is coupled through charge air cooler 18 to intake throttle 20 and intake throttle 20 is coupled upstream of intake manifold 22. The charge-air cooler may be an air-to-air or water-to-air heat exchanger, for example. In the embodiment shown in FIG. 1, the pressure of the air charge within the intake manifold is sensed by a manifold air pressure (MAP) sensor 124.

Compressor 110 may include a recirculation passage 80 across the compressor. The depicted example shows a compressor recirculation valve (CRV) 82 coupled across the recirculation passage 80, where actuation of the CRV 82 adjusts the flow through the recirculation passage 80. Warm, compressed air from the compressor outlet may be recirculated back to the compressor inlet via recirculation passage 80. In some embodiments, the compressor recirculation system may alternatively, or additionally, include a recirculation passage for recirculating (cooled) compressed air from the compressor outlet, downstream of the charge air cooler to the compressor inlet or a compressor bypass for dissipating compressed air to atmosphere (not shown). The CRV 82 may be a continuously variable valve wherein a position of the valve is continuously variable from a fully closed position to a fully open position. In some embodiments, compressor recirculation valve 82 may be held partially open during boosted engine operation to provide some surge margin. Herein, the partially open position may be a default valve position. Increasing the opening of the compressor recirculation valve may include actuating (or energizing) a solenoid of the valve. Further discussion of example CRV operation will be discussed herein.

One or more sensors may be coupled to an inlet of the compressor 110 for determining a composition and condition of air charge entering the compressor. For example, an intake air temperature (IAT) sensor 55 may be coupled to the intake passage 42, proximate the inlet of the compressor 110, for estimating a compressor inlet temperature. As another example, a pressure sensor 56 may be coupled to the inlet of the compressor for estimating a pressure of air charge entering the compressor. In a further example, a mass airflow (MAF) sensor 57 may also be coupled to the inlet of the compressor for estimating the amount of air entering the engine. Still other sensors may include, for example, air-fuel ratio sensors, humidity sensors, etc. In other examples, one or more of the compressor inlet conditions (such as humidity, temperature, etc.) may be inferred based on engine operating conditions. The sensors may estimate a condition of the intake air received at the compressor inlet from the intake passage as well as the air charge recirculated from upstream of the CAC. A throttle inlet pressure (TIP) sensor 58 or other suitable sensor, may be coupled downstream of the compressor 110 and upstream of the throttle 20, for measuring the boost pressure.

Intake manifold 22 is coupled to a series of combustion chambers 30 through a series of intake valves (described further with reference to FIG. 2). The combustion chambers are further coupled to exhaust manifold 36 via a series of exhaust valves (described further with reference to FIG. 2). In the depicted embodiment, a single exhaust manifold 36 is shown. However, in other embodiments, exhaust manifold 36 may include a plurality of exhaust manifold sections. Configurations having a plurality of exhaust manifold sections may enable effluent from different combustion chambers to be directed to different locations in the engine system 10. Sensor 125 may be coupled to the exhaust manifold for measuring exhaust flow.

Combustion chambers 30 may be supplied by a fuel system (described further with reference to FIG. 2) with one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. Direct injection comprises injecting the fuel directly into the combustion chamber, and port injection delivers the fuel spray into the intake ports where it mixes with the intake air before entering the combustion chamber. The present example may include a plurality of direct fuel injectors 66 and port fuel injectors 67. In the combustion chambers, combustion may be initiated via spark ignition and/or compression ignition.

Engine 10 may further include one or more exhaust gas recirculation (EGR) passages for recirculating a portion of exhaust gas from the exhaust manifold to the intake manifold. By recirculating some exhaust gas, an engine dilution may be affected which may improve engine performance by reducing engine knock, peak cylinder combustion temperatures and pressures, throttling losses, and NOx emissions. In the depicted example, exhaust gas may be recirculated from exhaust manifold 36, upstream of turbine 116, to intake manifold 22, downstream of compressor 110 and throttle 20 via high pressure EGR passage 84. This configuration may be known as a high pressure (HP) EGR system. High pressure EGR passage 84 may include an HP-EGR valve 86 for controlling HP EGR flow and an EGR cooler 88 for cooling exhaust gas prior to delivery in the intake manifold. In still further examples, exhaust gas may be recirculated from exhaust passage 35, downstream of turbine 116, to intake passage 42, upstream of compressor 110, via low pressure (LP) EGR passage 190 to provide LP-EGR. Exhaust gas flow in the LP-EGR passage is controlled via LP-EGR valve 52. The amount of EGR provided to intake passage may be varied by controller 12 via LP-EGR valve 52 and HP-EGR valve 86. The controller may attribute an amount of desired EGR flow to the HP-EGR and LP-EGR passage. As one example, if the desired amount of EGR flow is higher than the HP-EGR capacity, controller fully opens HP-EGR valve 86 and adjusts opening of the LP-EGR valve 52 to provide the desired EGR flow.

Engine system 100 may further include control system 14 which includes controller 12. Controller 12 is shown receiving information from a plurality of sensors 16 (various examples of which are described herein) and sending control signals to a plurality of actuators 81 (various examples of which are described herein). As one example, sensors 16 may include MAP sensor 124, exhaust flow sensor 125, exhaust temperature sensor 128, exhaust pressure sensor 129, intake air temperature sensor 55, compressor inlet pressure sensor 56, manifold air flow sensor 57, and throttle inlet pressure sensor 58. Other sensors such as additional pressure, temperature, air/fuel ratio, and composition sensors may be coupled to various locations in engine system 10. In one example, a compressor speed sensor 54 may be coupled to compressor 110 to determine a rotational speed of the compressor. According to one non-limiting embodiment, compressor speed sensor 54 may be a passive eddy current sensor. In one example, compressor speed sensor 54 may be a passive eddy current sensor. The actuators 81 may include, for example, throttle 20, compressor recirculation valve 82, direct fuel injector 66, port fuel injector 67, turbine actuator 117, high pressure EGR valve 86, and motor 111.

Control system 14 may be coupled to navigation system 154 and wireless communication device 152. Navigation system 154 determines the location of vehicle system 100 at key-on and at any other instant of time. A location (e.g., GPS co-ordinates of the vehicle) of the vehicle system 100 as estimated by the navigation system 154 may be stored at the control system 14 for use during the driving cycle. The navigation system may be connected to an external server and/or network cloud 160 via wireless communication 150. The navigation system 154 may determine the current location of the vehicle system 100 and obtain traffic and road condition data from a network cloud 160 for use when controlling engine operation. In addition, based on an operator selected destination, the navigation system 154 may provide various path selection, and then provide turn-by-turn instructions for navigating the vehicle system from a current location (e.g., place of origin) to the selected destination.

Controller 12 may also receive input data via a wireless communication device 152 using wireless communication 150 from one or more of a network cloud 160, vehicle-to-vehicle technology (V2V) 170 and vehicle-to-infrastructure technology (V2I) 180. V2V 180 may allow control system 14 to communicate with other similarly equipped vehicles that include wireless communication device 172, to gather information on traffic and road conditions from infrastructure that includes a wireless communication device 182. In one example, V2V may indicate vehicle speeds along an intended route, such as whether other vehicles may be stopped ahead, or whether there is stop-and-go traffic along the current route relative to an alternate route. In another example, V2I may indicate an impending red traffic light or a traffic accident along the predicted route. In this way, vehicle system 100 may communicate with remote sources (e.g., external network cloud, other vehicles, infrastructure) using one or more technologies (e.g., wireless communication, navigation system, GPS, V2V, V2I).

Various kinds of data, including but not limited to gradient map data and upcoming traffic conditions may be exchanged among vehicles and the network cloud and this data may be utilized for controlling vehicle operation. In one example, based on navigation system 154 input, controller 12 may recognize a travel pattern. Specifically, controller 12 may "learn" that a vehicle operator travels the same route every weekday morning commuting to work. The controller may store data about the route, including road gradient information and/or expected traffic conditions, and along with a learned driver model, may actively control the compressor casing treatment in order to avoid a predicted choke or predicted surge condition. A learned driver model may be developed by storing data related to the habits of a vehicle operator. For example, over the course of several weekday commutes, the controller may learn that during morning commutes, the driver exhibits relatively moderate driving habits (e.g., as indicated by gradual and infrequent actuation of the accelerator pedal and brake pedal, resulting in gradual acceleration and sporadic braking). This type of driving behavior, herein referred to as a "moderate driver pattern," may result in a low energy density actuation of the accelerator pedal.

In this way, the on-board controller 12 may communicate with on-board controllers of other vehicles via their respective navigation systems 154, via wireless communication device 152, and/or via other forms of vehicle to vehicle technology (V2V).

The controller 12 may employ the actuators 81 in response to the processed input data received from the various sensor based on instructions stored in the memory of the controller or code programmed therein corresponding to one or more routines, such as the example method 300 of FIG. 3. As one example, controller 12 may determine a compressor power deficiency based on measurements from pressure sensor 58, and adjust turbine actuator 117 and motor 111 to adjust the boost pressure.

Turning now to FIG. 2, an example embodiment 200 of a combustion chamber (e.g., cylinder) of an internal combustion engine (such as engine 10 of FIG. 1) is shown. Components previously introduced in FIG. 1 may be similarly numbered. Engine 10 may receive control parameters from a control system including controller 12 and input from a vehicle operator 230 via an input device 232. In this example, input device 232 includes an accelerator pedal and a pedal position sensor 234 for generating a proportional pedal position signal PP. Cylinder (herein also "combustion chamber") 30 of engine 10 may include combustion chamber walls 236 with piston 238 positioned therein. Piston 238 may be coupled to crankshaft 40 so that reciprocating motion of the piston is translated into rotational motion of the crankshaft. Crankshaft 40 may be coupled to at least one drive wheel of the vehicle system via a transmission system.

Cylinder 30 can receive intake air via intake passage 42, induction passage 43, and intake manifold 22. Intake manifold 22 may communicate with other cylinders of engine 10 in addition to cylinder 30. In some embodiments, one or more of the intake passages may include a boosting device such as a turbocharger or a supercharger. For example, FIG. 2 shows engine 10 configured with turbocharger 13 including compressor 110 arranged between intake passage 42 and induction passage 43, and an exhaust turbine 116 arranged between exhaust manifold 36 and exhaust passage 35. Compressor 110 may be at least partially powered by exhaust turbine 116 via shaft 19 where the boosting device is configured as a turbocharger. Compressor 110 may also be powered by electric motor 111 coupled to shaft 19. Motor 111 may output a motor power based on a control signal received from controller 12. Throttle 20 may include a throttle plate 264, and may be provided along an intake passage of the engine for varying the flow rate and/or pressure of intake air provided to the engine cylinders. For example, throttle 20 may be disposed downstream of compressor 110 or alternatively may be provided upstream of compressor 110.

Exhaust manifold 36 may receive exhaust gases from other cylinders of engine 10 in addition to cylinder 30. Exhaust gas sensor 228 is shown coupled to exhaust manifold 36 upstream of emission control device 278, but it will be appreciated that it may be located at other locations in the exhaust system. Exhaust gas sensor 228 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 278 may be a three way catalyst (TWC), NOx trap, various other emission control devices, or combinations thereof.

Each cylinder of engine 10 may include one or more intake valves and one or more exhaust valves. For example, cylinder 30 is shown including at least one poppet-style intake valve 250 and at least one poppet-style exhaust valve 256 located at an upper region of cylinder 30. In some embodiments, each cylinder of engine 10, including cylinder 30, may include at least two intake poppet valves and at least two exhaust poppet valves located at an upper region of the cylinder.

Intake valve 250 may be controlled by controller 12 by cam actuation via cam actuation system 251. Similarly, exhaust valve 256 may be controlled by controller 12 via cam actuation system 253. Cam actuation systems 251 and 253 may each include one or more cams and may utilize one or more of cam profile switching (CPS), variable cam timing (VCT), variable valve timing (VVT), and/or variable valve lift (VVL) systems that may be operated by controller 12 to vary valve operation. Whether electronically actuated or cam actuated, the timing of exhaust and intake valve opening and closure may be adjusted as specified for desired combustion and emissions-control performance. The operation of intake valve 250 and exhaust valve 256 may be determined by valve position sensors (not shown) and/or camshaft position sensors 255 and 257, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. Additionally, a VCT system may include one or more VCT devices (not shown) that may be actuated to adjust the timing of the intake and exhaust valves to a timing that provides decreased positive intake to exhaust valve overlap. That is to say, the intake and exhaust valves will be open for a shorter duration and will move away from being simultaneously open for a portion of the intake stroke. In still other embodiments, the intake and exhaust valves may be controlled by a common valve actuator or actuation system, or a variable valve timing actuator or actuation system.

In some embodiments, each cylinder of engine 10 may be configured with one or more injectors for delivering fuel to the cylinder 30. As a non-limiting example, cylinder 30 is shown including two fuel injectors 66 and 67. Fuel injectors 66 and 67 may be configured to deliver fuel received from fuel system 288 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 66 is shown coupled directly to cylinder 30 for injecting fuel directly therein in proportion to the pulse width of signal FPW-1 received from controller 12 via electronic driver 268. In this manner, fuel injector 66 provides what is known as direct injection (hereafter referred to as "DI") of fuel into combustion cylinder 30. While FIG. 2 shows injector 66 positioned to one side of cylinder 30, it may alternatively be located overhead of the piston, such as near the position of spark plug 292. Such a position may improve mixing and combustion when operating the engine with an alcohol-based fuel due to the lower volatility of some alcohol-based fuels. Alternatively, the injector may be located overhead and near the intake valve to improve mixing.

Fuel injector 67 is shown arranged in intake manifold 22, rather than in cylinder 30, in a configuration that provides what is known as port injection of fuel (hereafter referred to as "PFI") into the intake port upstream of cylinder 30. Fuel injector 67 may inject fuel, received from fuel system 288, in proportion to the pulse width of signal FPW-2 received from controller 12 via electronic driver 271. Note that a single electronic driver 268 or 271 may be used for both fuel injection systems, or multiple drivers, for example electronic driver 268 for fuel injector 66 and electronic driver 271 for fuel injector 67, may be used, as depicted.

Fuel may be delivered by both injectors to the cylinder during a single cycle of the cylinder. For example, each injector may deliver a portion of a total fuel injection that is combusted in cylinder 30. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 2 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 2 with reference to cylinder 30.

The engine may further include one or more exhaust gas recirculation passages. In the depicted embodiment, exhaust gas may be recirculated from exhaust passage 35 (e.g., downstream of turbine 116) to intake passage 42 (e.g., upstream of compressor 110) via LP-EGR passage 190. Further, an EGR sensor 245 may be arranged within the EGR passage 190 and may provide an indication of one or more of pressure, temperature, and concentration of the exhaust gas. Other non-limiting example EGR configurations may include HP-EGR (such as HP-EGR passage 84 of FIG. 1) and an HP-EGR sensor arranged within the HP-EGR passage for measuring one or more of pressure, temperature, and concentration of the exhaust gas.

Controller 12 is shown as a microcomputer, including microprocessor unit 206, input/output ports 208, an electronic storage medium for executable programs and calibration values shown as read-only memory chip 210 in this particular example, random access memory 212, keep alive memory 214, and a data bus. Controller 12 may receive various signals from various sensors of FIGS. 1-2 and employs the various actuators of FIGS. 1-2 to adjust engine operation based on the received signals and instructions stored on a memory of the controller. In addition to those signals previously discussed, the controller 12 may receive signals including measurement of engine coolant temperature (ECT) from temperature sensor 216 coupled to cooling sleeve 218; a profile ignition pickup signal (PIP) from Hall effect sensor 220 (or other type) coupled to crankshaft 40; throttle position (TPS) from a throttle position sensor; and manifold absolute pressure signal (MAP) from sensor 224. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system. Storage medium read-only memory chip 210 can be programmed with computer readable data representing instructions executable by microprocessor unit 206 for performing the methods described below as well as other variants that are anticipated but not specifically listed.

FIG. 3 shows method 300 for adjusting the actuators including the turbine (such as turbine 116 of FIGS. 1-2) position, the HP-EGR valve (such as EGR valve 86 of FIG. 1) position, and the motor (such as motor 111 of FIG. 1), to track the target boost pressure and the target EGR flow. The actuators are grouped differently for the boost pressure control or the EGR control responsive to the power deficiency.

Instructions for carrying out method 300 and the rest of the methods included herein may be executed by a controller based on instructions stored on a memory of the controller (such as controller 12 of FIGS. 1-2) and in conjunction with signals received from sensors of the engine system, such as the sensors described above with reference to FIGS. 1-2. The controller may employ engine actuators of the engine system to adjust engine operation, according to the methods described below.

At 302, method 300 estimates and/or measures engine operating conditions including, but not limited to, engine speed, fuel amount, fuel pressure, operator torque demand, engine coolant temperature (ECT), barometric pressure (BP), boost pressure, intake manifold pressure (boost pressure), exhaust manifold pressure, mass airflow rate (MAF), exhaust air flow rate, an accelerator pedal position (PP), EGR flow, and EGR rates as may be measured and/or estimated by the output of respective sensors described in reference to FIGS. 1 and 2.

At 304, a desired engine operating point may be determined. The desired operating point may include the target boost pressure, the target exhaust flow, the target turbo speed, and the target EGR flow or EGR rate. As one example, the desired engine operating point may be determined based on the operator input. As another example, the desired engine operating point may be automatically generated by the controller or external sources such as the cloud, based on road condition, vehicle route, engine operating conditions, and driving habits.

At 308, method 300 determines whether assisted power is required for the turbocharger. The assisted power may be required responsive to a positive power deficiency, wherein the target compressor output power is higher than the actual compressor output power. If the assisted power is required, the controller may operate the motor to rotate a shaft (such as shaft 19 of FIG. 1) and increase the compressor power output. In one embodiment, the compressor power deficiency may be calculated based on the difference between the target boost pressure determined at 304 and the boost pressure measured at 302. In another embodiment, the compressor power deficiency may be determined based on the target boot pressure and the current VGT position. For example, the target compressor power may be determined based on the target boost pressure, and the actual compressor power may be determined based on the turbine power, which may be calculated based on the actual VGT position and exhaust flow conditions (measured or estimated flow rate, or temperature or pressure). The compressor power deficiency is determined as the difference between the target compressor power and the actual compressor power. If the compressor power deficiency is negative, no assisted power is required, and the engine is operated in the first mode 310. Otherwise, method 300 moves to 309 and operates the motor for providing assisted power.

Figure 6:
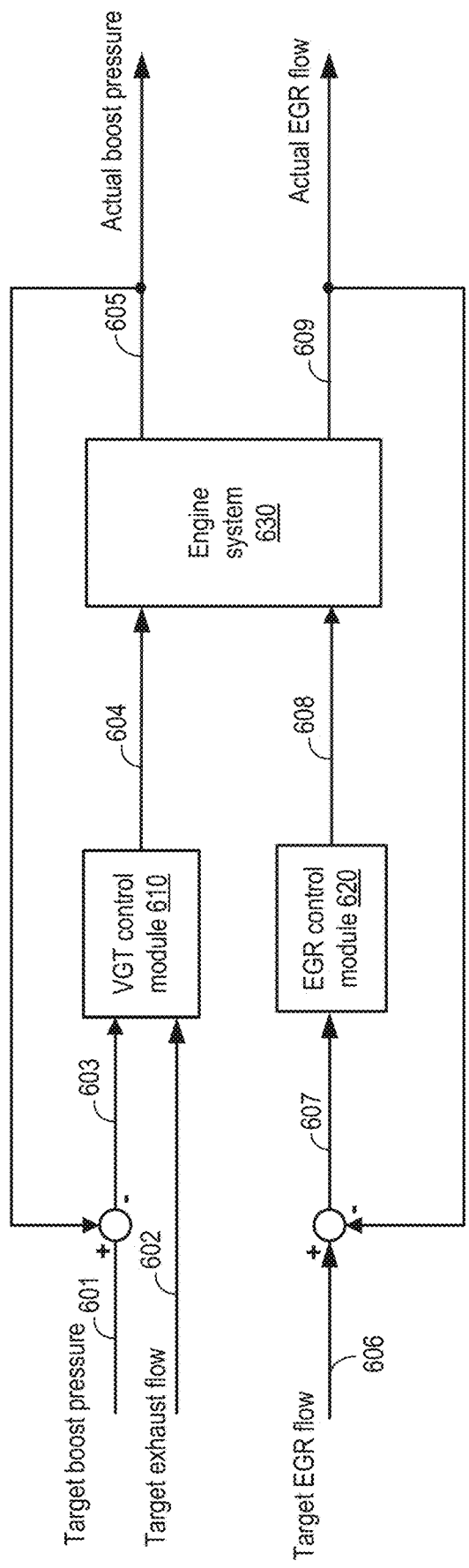
FIG. 6 is an example block diagram for a first engine operation mode.

In the first engine operating mode of 310, the VGT position is adjusted to track the target boost pressure, and the EGR valve is adjusted to track the EGR flow. The VGT position is not adjusted to track the EGR flow, and the EGR valve is not adjusted to track the boost pressure. The motor may be not operated or operated in the regenerative mode. FIG. 6 illustrates an example block diagram for operating the engine under the first operation mode.

Figure 4:
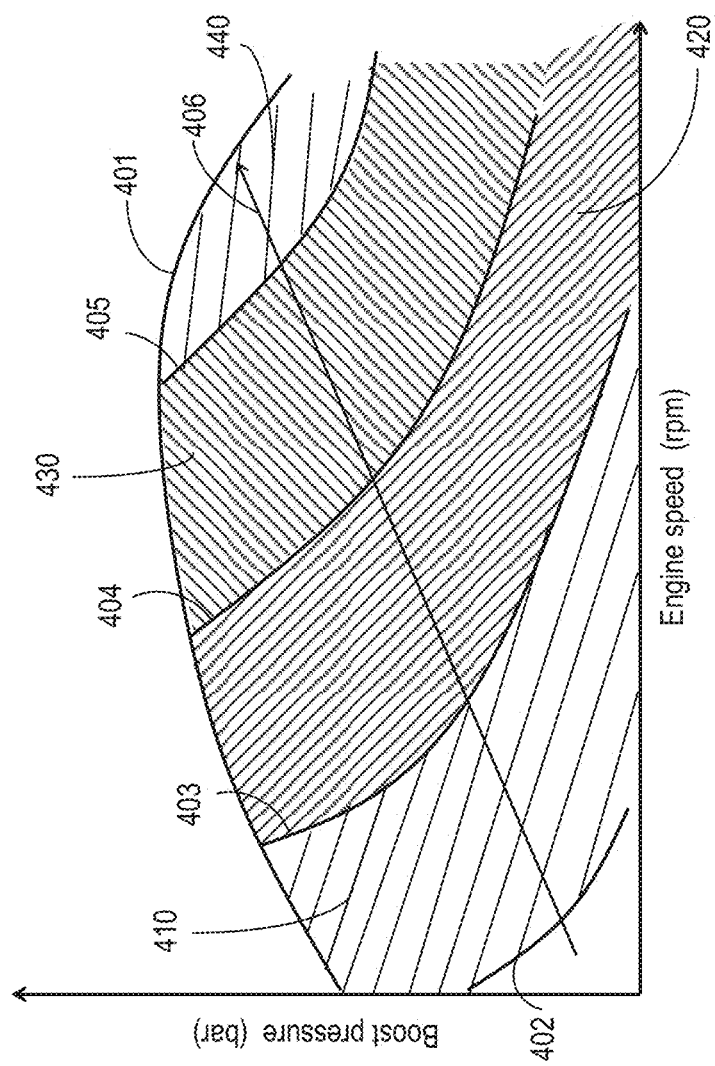
FIG. 4 is an example map for determining a power deficiency threshold.

At 309, method 300 determines a power deficiency threshold TH. In one embodiment, the threshold TH may be determined based on the measured/estimated actual boost pressure and the measured engine speed at 302. FIG. 4 shows an example map for determining the threshold TH. The x-axis is the engine speed, and the y-axis is the boost pressure. Line 401 indicates the maximum boost pressure that can be provided by the engine at certain boost speed. In one embodiment, lines 402, 403, 404, and 405 are example thresholds. The threshold TH along each line (402-405) is the same. The thresholds increase with increased engine speed and increased boost pressure, as indicated by arrow 406. That is, threshold 405>threshold 404>threshold 403>threshold 402. In one embodiment, one threshold may be assigned for a range of boost pressure and a range of engine speed. For example, the threshold in each area of 410, 420, 430, and 440 may be the same. The assigned threshold may increase as indicated by arrow 406.

The threshold may further be adjusted based on the motor type, the driving mode of the vehicle, and the state of charge of the battery. For example, the threshold may be limited by the maximum motor power that the motor is designed to deliver. The threshold may be lower in an eco-drive mode comparing to a sport drive mode. The threshold may be decreased with increased state of charger of the battery.

At 316, method 300 compares the power deficiency with the power deficiency threshold TH determined at 309. If the power deficiency is less than the threshold TH, the engine operates in the second mode 318. If the power deficiency equals to or is greater than the threshold TH, the engine operates in the third mode 328.

In the second mode 318, the VGT position is first adjusted to achieve the desired (e.g., maximum) turbine efficiency, and the motor is then adjusted for supplying additional power to meet the target boost pressure. The EGR valve is adjusted based on the target EGR flow. The EGR control is separated from the VGT position control. By adjusting the VGT to the position with the desired turbine efficiency (in one example maximum achievable), power consumption of the motor may be reduced.

Figure 5:
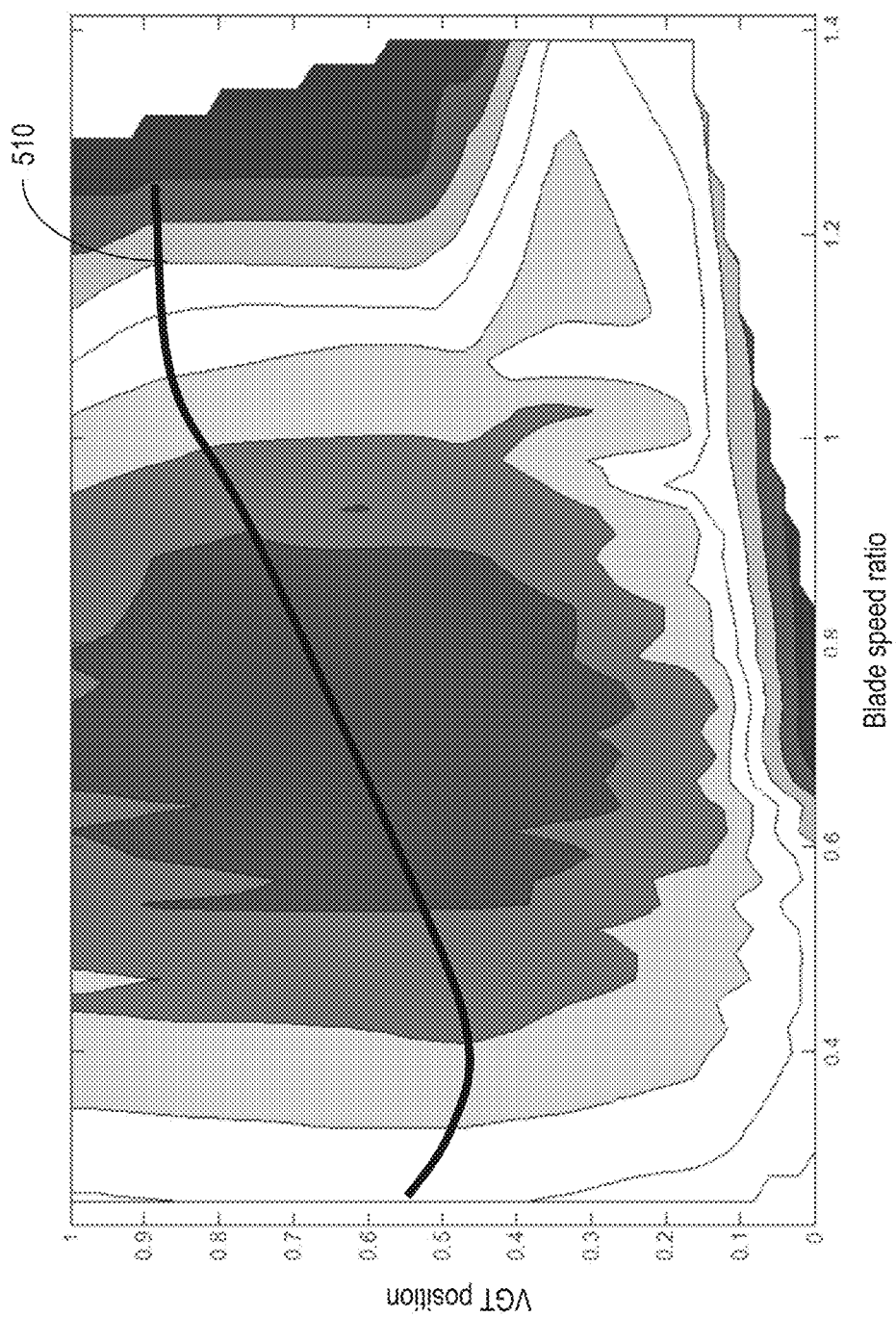
FIG. 5 is a map for determining a VGT position with the desired turbine efficiency.
Figure 7:
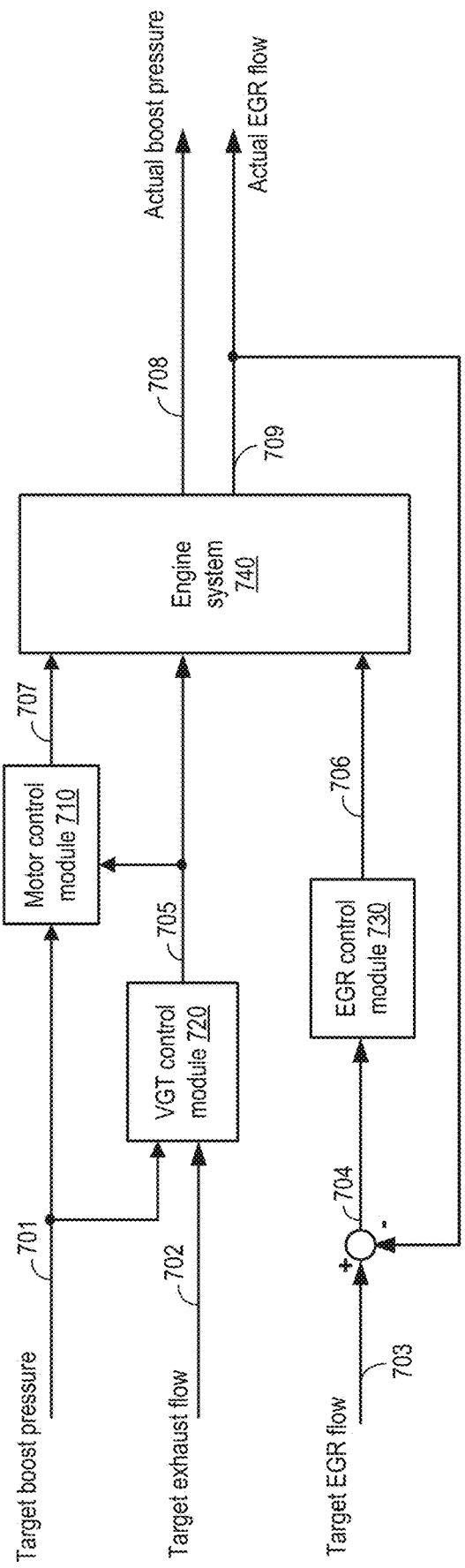
FIG. 7 is an example block diagram for a second engine operation mode.

At 320, the VGT position may be calculated based on the blade speed ratio of the turbine for the desired turbine efficiency. The desired turbine efficiency may be the maximum turbine efficiency achievable by the turbine at a specific blade speed ratio. The blade speed ratio may be calculated based on the target exhaust flow and the turbocharger speed. In one example, the turbocharger speed may be measured or estimated. In another example, the turbocharger speed may be estimated based on the target boost pressure. FIG. 5 shows an example contour graph of the turbine efficiency with respect to the VGT positions and the blade speed ratio. The y-axis is the VGT position, and the x-axis is the blade speed ratio. The contours show the turbine efficiency. The maximum turbine efficiency is illustrated with line 510. Thus, given a blade speed ratio, the VGT position that has the optimal (maximum) turbine efficiency may be determined based on FIG. 5. Alternatively, the VGT position with the desired turbine efficiency may be determined via a lookup table constructed based on FIG. 5. Method 300 further updates the compressor power deficiency based on the calculated VGT position and the target boost pressure at 320. FIG. 7 shows an example block diagram for operating the engine in the second operating mode.

At 322, the actual EGR flow rate is estimated or measured. As one example, the EGR flow rate may be estimated based on the boost pressure, the exhaust manifold pressure or flow, and the degree of opening of the EGR valve. As another example, the EGR flow rate may be measured by a sensor coupled to the high pressure EGR passage.

At 324, the VGT is actuated to move to the calculated VGT position, the motor is operated to supply the updated power deficiency, and the EGR valve is adjusted to track the target EGR flow based on the estimated EGR flow at 322.

If the power deficiency equals to or is greater than the threshold TH, the engine is operated in the third mode 328. High power deficiency may lead to high EGR flow deficiency. For example, responsive to a transient tip-in, the boost pressure may increase faster than the exhaust pressure with aggressive assisted electric power. The change in pressure difference across the high pressure EGR passage may reduce the EGR flow rate, causing a deficiency in the EGR flow. Operating the EGR valve alone may not be sufficient to meet the increased EGR flow requirement. To overcome the EGR deficiency, the VGT and the EGR valve may be adjusted together to increase the EGR flow, and the motor may be adjusted to track the target boost pressure based on the target VGT position. Comparing to the second mode, wherein the VGT is adjusted to achieve the desired turbine efficiency to reduce power consumption, herein, the fuel economy is sacrificed to reduce the emission and improve the drivability. FIG. 8 shows an example block diagram for operating the engine in the third operating mode.

At 330, method 300 estimates the actual EGR flow similar to 322.

At 332, the VGT and EGR valve positions are calculated based on the estimated EGR flow and the target EGR flow. The power deficiency may then be determined based on the calculated VGT position and the target boost pressure.

At 334, the VGT and EGR valve are adjusted to the calculated positions, and the motor is actuated to meet the power deficiency.

At 336, method 300 checks whether the boost pressure and the EGR rate/flow target have been met. For example, the boost and the EGR targets are met when the error between the actual boost pressure and the target boost pressure is within a threshold percentage range (such as 5%) of the target boost pressure, and the error between the actual EGR flow and the target EGR flow is within a threshold percentage range (such as 5%) of the target EGR flow. Method 300 ends when the boost and the EGR targets met. Otherwise, method 300 returns to 302 to estimate the engine operating conditions.

FIG. 6 illustrates an example block diagram for operating the engine under the first operation mode. The VGT control module 610 outputs the VGT position signal to the VGT actuator (such as actuator 117 of FIG. 1) of the engine system 630, based on the target exhaust flow rate 602 and the difference between the target boost pressure 601 and the actual boost pressure 605. The EGR control module 620 outputs the EGR control signal 608 to the EGR valve (such as the high pressure EGR valve 86 of FIG. 1) of the engine system 630 based on the difference between the target EGR flow rate 606 and the actual EGR flow rate 609. The actual boost pressure 605 may be measured via a sensor (such as pressure sensor 58 of FIG. 1). The actual EGR flow may be estimated based on the manifold air pressure (measured for example by sensor 124 of FIG. 1), the exhaust manifold flow (measured for example by sensor 125 of FIG. 1), and opening degree of the EGR valve. The actual EGR flow may alternatively be measured by a sensor coupled to the high pressure EGR passage.

In this way, the VGT position and the EGR valve position are separately controlled based on two different feedback control loops. Specifically, the VGT position is adjusted based on target boost pressure, and the EGR valve position is adjusted based on the target EGR flow. The VGT control module 610 and the EGR control module 620 may be PID controllers.

FIG. 7 shows an example block diagram for operating the engine in the second operation mode. The VGT control module 720 outputs the VGT position control signal 705 to the VGT actuator of the engine system 740, based on the target boost pressure 701 and the target exhaust flow rate 702. The VGT control module first calculates the blade speed ratio based on the target boost pressure 701 and the target exhaust flow rate 702, then determines the VGT position that results in the desired turbine efficiency via the map or lookup table such the one shown in FIG. 5. VGT position control signal is generated based on the target boost pressure, but not the target EGR flow. The VGT position control signal 705 may be determined based on the identified VGT position. The motor control module outputs the motor control signal 707 to the motor (such as motor 111 of FIG. 1) of the engine system 740 based on the target boost pressure 701 and the VGT position control signal 705. For example, the motor control module may calculate the actual boost pressure based on the VGT position control signal 705, then calculates the power deficiency based on the target boost pressure and the actual boost pressure. The motor control signal 707 may then be determined based on the calculated power deficiency. The EGR control module 730 outputs the EGR control signal to the EGR valve (such as HP-EGR valve 86 of FIG. 1) of the engine system 740, based on the difference between the target EGR flow rate 703 and the actual EGR flow rate 704. The EGR control module 730 may be a PID controller. The actual boost pressure 708 may be measured via sensor (such as sensor 58 of FIG. 1).

In this way, the boost pressure may be adjusted via an open loop control, while the EGR flow is adjusted via a closed loop control. The boost pressure is controlled by the VGT and the motor, while the EGR is controlled by the EGR valve. In other words, the VGT and the motor is grouped together for boost control, and the EGR valve is operated for EGR rate control.

FIG. 8 shows an example block diagram for operating the engine in the third operation mode. Based on both the target exhaust flow 802 and the difference 809 between the target EGR flow 803 and the actual EGR flow 808, the EGR control module 820 outputs the VGT position control signal 805 to the VGT actuator of the engine system 830 and the EGR valve position control signal to the EGR valve of the engine system 830. As such, the VGT position and the EGR valve are both adjusted based on the EGR flow feedback to track the target EGR flow. The EGR control module 820 may be a PID controller. The motor control module 810 outputs the motor control signal 804 to the motor of the engine system 830 based on the target boost pressure 801 and the VGT position control signal 805. The motor control module may first calculated the turbine power based on the VGT position control signal, and then determines the compressor power deficiency based on the target boost pressure and the calculated turbine power. The motor control signal is then calculated based on the compressor power deficiency.

In this way, the actual boost pressure 807 may track the target boost pressure 801, and the actual EGR flow 808 may track the target EGR flow. In the third mode, the motor is adjusted for boost pressure control, while the VGT and the EGR valve are grouped together for EGR control. Different from the second mode wherein the VGT is not adjusted based on the feedback of the actual EGR flow, herein, the VGT is adjusted based on the feedback of the actual EGR flow.

FIG. 9 shows an example timeline of parameters while operating the engine based on method 300 of FIG. 3. The engine may transition from one operation mode to another responsive to the target boost power and the engine operating condition. Plot 910 shows the boost pressure. The boost pressure increases as indicated by the y-axis. The target boost pressure 912 is illustrated with the dashed line, while the actual boost pressure is 911 is illustrated with the solid line. Plot 920 shows the high pressure EGR flow rate. The EGR flow rate increases as indicated by the y-axis. The target EGR flow 922 is illustrated with the dashed line, while the actual EGR flow 921 is illustrated with the solid line. Plot 930 shows the power deficiency. The power deficiency is positive when assistance from the motor (such as motor 111 of FIG. 1) is required. The power deficiency is zero or negative when no assistance from the motor is required. The power deficiency increases as indicated by the y-axis. Plot 940 is the degree of opening of the VGT blades. The VGT blades are completely closed at 0% opening, wherein the restriction to the exhaust gas flow is the highest. The VGT blades are completely open at 100% opening, wherein the restriction to the exhaust gas flow is the lowest. The degree of opening increases as indicated by the y-axis. Plot 950 shows the degree of opening of the high pressure EGR valve. The EGR valve is completely open at 100% opening, wherein there is no restriction to the EGR flow. The EGR valve is completely closed at 0% opening, wherein there is no EGR flow through the EGR passage. The degree of opening increases as indicated by the y-axis. Plot 960 shows the power of the motor (such as motor 111 of FIG. 1) coupled between the compressor and the turbine for supplying assistant power. The motor power is positive when the motor draws current from the battery and increases the compressor power output. The motor power is negative when the motor runs in the regenerate mode and charges the battery. The motor power output increases as indicated by the y-axis. The x-axes of the plots indicate time and the time increases from the left to the right side of the plot. Plot 970 shows the engine operation mode as presented in FIG. 3 and FIGS. 6-8.

From T0 to T1, the engine is in an idle mode. The target boost pressure is low. The compressor power deficiency is zero. The engine is operated in the first mode. The VGT position is adjusted to track the target boost pressure, and the EGR valve is adjusted to track the EGR flow. The VGT blades are closed. The EGR valve is closed as the target EGR flow is zero. The motor power is zero.

At T1, the target boost pressure increases sharply due to an aggressive tip-in. The power deficiency 931 thus increases sharply from zero. Threshold 932 of the power deficiency is updated based on the current engine speed and the current boost pressure. Since the power deficiency 931 is greater than the threshold 932, the engine is operated in the third mode, wherein the target EGR flow is tracked by adjusting the VGT position and EGR valve opening, and the target boost pressure is tracked by increasing the motor power output. The VGT opening 940 remains low to increase the EGR flow. From T1 to T2, the actual boost pressure 911 increases to the target boost pressure 912 and the actual EGR flow 921 increases to the target EGR flow 922. The power deficiency decreases from T1 to T2. As a result, the motor power output also decreases from T1 to T2.

At T2, the power deficiency threshold 932 increases responsive to the increased boost pressure and the engine speed (not shown). Responsive to the power deficiency 931 less than the threshold 932, the engine operates in the second mode. The VGT position is adjusted to the desired efficiency, and the EGR valve is adjusted to track the EGR flow. The motor power is positive and is adjusted based on the VGT opening and the target boost pressure. From T2 to T3, the actual boost pressure and the actual EGR flow keep increasing to track their target value. The motor power output is positive and decreases with decreased power deficiency.

At T3, the target boost pressure 912 decreases, and the power deficiency 931 becomes negative. As a result, the engine operates in the first mode. The motor runs in the regenerative mode and the motor power 960 becomes negative. The threshold 932 for power deficiency increases with increased engine speed and the boost pressure. With increased VGT opening and decreased EGR valve opening, the boost pressure and the EGR flow decreases to track their target levels.

At T4, the target boost pressure 912 increases and the target EGR flow 922 also increases. As the power deficiency is lower than threshold 932 but above zero, the engine is operated in the second mode. Motor power is positive to reduce the power deficiency. Between T4 and T5, threshold 932 increases responsive to increased boost pressure and engine speed. The actual boost pressure and actual EGR flow approaches their target values.

At T5, the power deficiency reaches zero. The engine thus operates in the first mode. The motor output power is zero. The VGT opening is adjusted to track the target boost pressure, and the EGR valve is adjusted to track the target boost pressure.

In this way, in an engine including an electric assisted VGT, the actuators are operated differently to control boost pressure and the EGR flow responsive to the level of the power deficiency. For example, the VGT is adjusted based on the target boost pressure for the desired maximum turbine efficiency if the power deficiency is between zero and a threshold. The VGT is adjusted based on the target EGR flow if the power deficiency is higher than the threshold. The technical effect of setting the VGT to the position with the desired turbine efficiency is that improved fuel/power efficiency may be achieved without affecting the drivability of the vehicle. The technical effect of adjusting the VGT based on the target EGR flow is that the EGR deficiency during aggressive tip-in may be avoided and the vehicle may quickly track sharp increase of the target boost pressure. The technical effect of adjusting the threshold based on the engine operating conditions is that the operation mode may be switched responsive to the current engine operating point for improved drivability.

As one embodiment, a method for an engine includes responsive to a positive power deficiency below a threshold, adjusting a position of a turbine coupled to a compressor for a desired turbine efficiency, the compressor providing boosted air to an engine and the power deficiency being a difference between a target pressure and an actual boost pressure; and responsive to the power deficiency above the threshold, adjusting the turbine position based on a target flow of exhaust gases recirculation (EGR) back into the engine. In a first example of the method, operating a motor coupled between the compressor and the turbine based on the target boost pressure and the adjusted turbine position. A second example of the method optionally includes the first example and further includes determining the threshold based on an engine speed and the actual boost pressure. A third example of the method optionally includes responsive to zero or negative power deficiency, adjusting the turbine position based on the target boost pressure, and adjusting an EGR valve based on the target EGR flow. A fourth example of the method optionally includes one or more of the first through third examples, and further includes, determining the actual boost pressure based on an actual turbine position. A fifth example of the method optionally includes one or more of the first through fourth examples, and further includes, responsive to the power deficiency above the threshold, adjusting an EGR valve based on the target EGR flow. A sixth example of the method optionally includes one or more of the first through fifth examples, and further includes, wherein both the turbine position and the EGR valve are adjusted based on the target EGR flow via a feedback controller. A seventh example of the method optionally includes one or more of the first through sixth examples, and further includes, estimating an EGR flow, and operating a motor coupled between the compressor and the turbine based on the estimated EGR flow. A eighth example of the method optionally includes one or more of the first through seventh examples, and further includes, responsive to the positive power deficiency below the threshold, adjusting an EGR valve position based on a measured EGR flow and the target EGR flow. A ninth example of the method optionally includes one or more of the first through eighth examples, and further includes, wherein the desired turbine efficiency is a maximum turbine efficiency determined based on a blade speed ratio.

As one embodiment, a method for an engine includes determining a power deficiency based on a target boost pressure and a measured boost pressure from a compressor driven by a turbine having variable vane positions and coupled to an exhaust of an engine, the compressor delivering compressed air to the engine; responsive to the power deficiency in a first range, adjusting the turbine position based on the target boost pressure; responsive to the power deficiency in a second range, adjusting the turbine position for a desired turbine efficiency; and responsive to the power deficiency in a third range, adjusting the turbine position based on a target flow of engine exhaust gases recirculation (EGR) back into the engine. In a first example of the method, wherein the second range is higher than the first range, and the third range is higher than the second range. A second example of the method optionally includes the first example and further includes responsive to the power deficiency in the first range, adjusting an EGR valve positioned in the EGR flow back in to the engine based on a target EGR flow via a feedback controller. A third example of the method optionally includes one or more of the first and second examples, and further includes, responsive to the power deficiency in the second range or in the third range, operating a motor coupled between the compressor and the turbine to output a motor power to drive the compressor determined based on the target boost pressure and the adjusted turbine position. A fourth example of the method optionally includes one or more of the first through third examples, and further includes, wherein the first range is equal or below zero power deficiency; the second range is from zero deficiency to a positive threshold power deficiency; the third range is equal or greater than the positive threshold power deficiency. A fifth example of the method optionally includes one or more of the first through fourth examples, and further includes, wherein the threshold is updated based on an engine operating condition. A sixth example of the method optionally includes one or more of the first through fifth examples, and further includes, wherein the threshold increases with increased engine speed and increased measured boost pressure.

As another embodiment, an engine system includes a high pressure EGR passage coupled between an intake manifold and an exhaust manifold of an engine; an EGR valve coupled to the high pressure EGR passage to control an EGR flow; a turbocharger including a compressor, a variable geometry turbine, and an electric motor coupled to both the compressor and the turbine; a controller with computer readable instructions stored on non-transitory memory configured to: operate the engine in a first mode to adjust a position of the turbine based on a target boost pressure and adjust a position of the EGR valve based on a target EGR flow; operate the engine in a second mode to adjust the turbine position and the EGR valve position based on the target EGR flow; operate the engine in a third mode to adjust the turbine position for an desired turbine efficiency and adjust the EGR valve position based on the target EGR flow and the adjusted turbine position; and transition among the first mode, the second mode, and the third mode responsive to a power deficiency. In a first example of the system, wherein the controller is further configured to transition among the first mode, the second mode, and the third mode by comparing the power deficiency with a positive threshold, wherein the threshold is adjusted based on an engine operating condition. A second example of the method optionally includes the first example and further includes, the engine is operated in the first mode when the power deficiency is equal to or lower than zero, the engine is operated in the second mode when the power deficiency is between zero and the threshold, and the engine is operated in the third mode when the power deficiency is equal to or greater than the threshold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
estimating a power deficiency threshold based on an estimated boost pressure and an estimated engine speed;
responsive to a power deficiency being below the power deficiency threshold, adjusting a position of a turbine coupled to a compressor based on a desired turbine efficiency, the compressor providing boosted air to an engine, and the power deficiency being a difference between a target boost pressure and the estimated boost pressure; and
responsive to the power deficiency being above the power deficiency threshold, adjusting the position of the turbine based on a target flow of exhaust gases recirculated back into the engine.

2. The method of claim 1, further comprising operating a motor coupled between the compressor and the turbine based on the target boost pressure and the adjusted turbine position.

3. The method of claim 1, further comprising, responsive to zero or negative power deficiency, adjusting the turbine position based on the target boost pressure, and adjusting an exhaust gas recirculation (EGR) valve based on the target flow of recirculated exhaust gases.

4. The method of claim 1, further comprising determining the estimated boost pressure based on an actual turbine position.

5. The method of claim 1, further comprising, responsive to the power deficiency being above the threshold, adjusting an exhaust gas recirculation (EGR) valve based on the target flow of recirculated exhaust gases.

6. The method of claim 5, wherein both the turbine position and the EGR valve are adjusted based on the target flow of recirculated exhaust gases via a feedback controller.

7. The method of claim 6, further comprising estimating an actual flow of exhaust gases recirculated back into the engine, and operating a motor coupled between the compressor and the turbine based on the actual flow of exhaust gases recirculated back into the engine.

8. The method of claim 1, further comprising, responsive to a positive power deficiency below the threshold, adjusting an exhaust gas recirculation (EGR) valve position based on a measured EGR flow and the target flow of exhaust gases recirculated back into the engine.

9. The method of claim 1, wherein the desired turbine efficiency is a maximum turbine efficiency determined based on a blade speed ratio.

10. A method comprising:
determining a power deficiency based on a target boost pressure and a measured boost pressure from a compressor driven by a turbine having variable vane positions and coupled to an exhaust of an engine, the compressor delivering compressed air to the engine;
estimating a power deficiency threshold based on the measured boost pressure and a measured engine speed;
responsive to the power deficiency in a first range relative to the power deficiency threshold, adjusting a turbine position based on the target boost pressure;
responsive to the power deficiency in a second range relative to the power deficiency threshold, adjusting the turbine position for a desired turbine efficiency; and
responsive to the power deficiency in a third range relative to the power deficiency threshold, adjusting the turbine position based on a target flow of engine exhaust gas recirculation (EGR) back into the engine.

11. The method of claim 10, wherein the second range is higher than the first range, and the third range is higher than the second range.

12. The method of claim 10, further comprising, responsive to the power deficiency in the first range, adjusting an EGR valve positioned in an EGR flow back into the engine based on the target EGR flow via a feedback controller.

13. The method of claim 10, further comprising, responsive to the power deficiency in the second range or in the third range, operating a motor coupled between the compressor and the turbine, the motor operated by a motor power to drive the compressor based on the target boost pressure and the adjusted turbine position.

14. The method of claim 10, wherein the first range is equal or below zero power deficiency; the second range is from zero deficiency to lower than the power deficiency threshold; the third range is equal or greater than the power deficiency threshold.

15. The method of claim 14, wherein the power deficiency threshold is updated based on an engine operating condition.

16. The method of claim 14, wherein the power deficiency threshold increases with increased engine speed and increased measured boost pressure.

17. An engine system, comprising:
a high pressure EGR passage coupled between an intake manifold and an exhaust manifold of an engine;
an EGR valve to control an EGR flow through the EGR passage;
a turbocharger including a compressor, a variable geometry turbine, and an electric motor coupled to both the compressor and the turbine;
a controller with computer readable instructions stored on non-transitory memory configured to:
operate the engine in a first mode to adjust a position of the turbine based on a target boost pressure and adjust a position of the EGR valve based on a target EGR flow;
operate the engine in a second mode to adjust the turbine position and the EGR valve position based on the target EGR flow;
operate the engine in a third mode to adjust the turbine position for a desired turbine efficiency and adjust the EGR valve position based on the target EGR flow and the adjusted turbine position;
estimating a power deficiency threshold based on an actual boost pressure and a measured engine speed; and
transition among the first mode, the second mode, and the third mode responsive to a power deficiency relative to the power deficiency threshold, the power deficiency based on a difference between the target boost pressure and the actual boost pressure.

18. The engine system of claim 17, wherein the engine is operated in the first mode when the power deficiency is equal to or lower than zero, the engine is operated in the second mode when the power deficiency is between zero and the power deficiency threshold, and the engine is operated in the third mode when the power deficiency equals to or is greater than the power deficiency threshold.

* * * * *